March 4, 1930.  L. CASKIN  1,749,465

SNOW SHOVEL ATTACHMENT FOR VEHICLES

Filed Aug. 9, 1928  2 Sheets-Sheet 1

Inventor
Langdon Caskin

Attorneys

March 4, 1930.  L. CASKIN  1,749,465
SNOW SHOVEL ATTACHMENT FOR VEHICLES
Filed Aug. 9, 1928  2 Sheets-Sheet 2
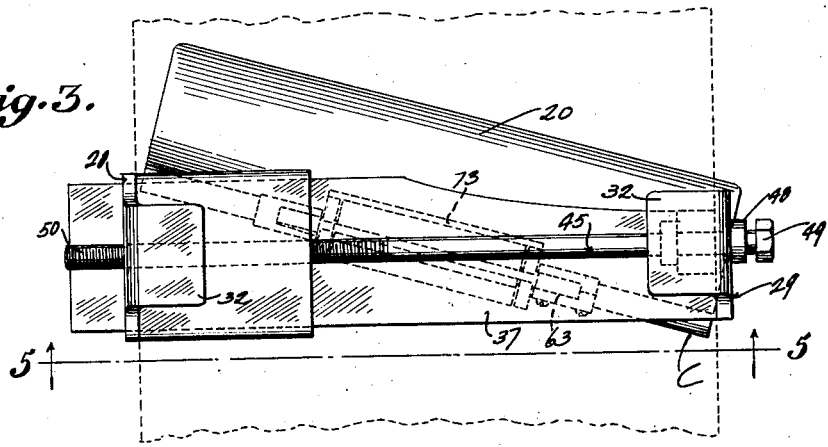
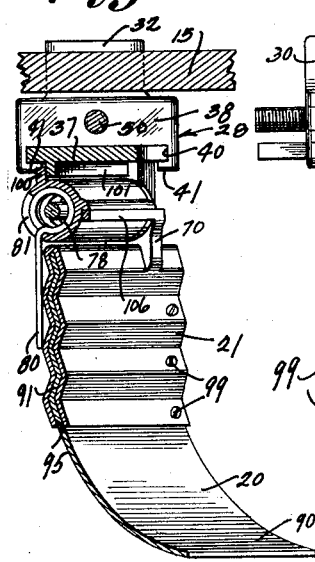
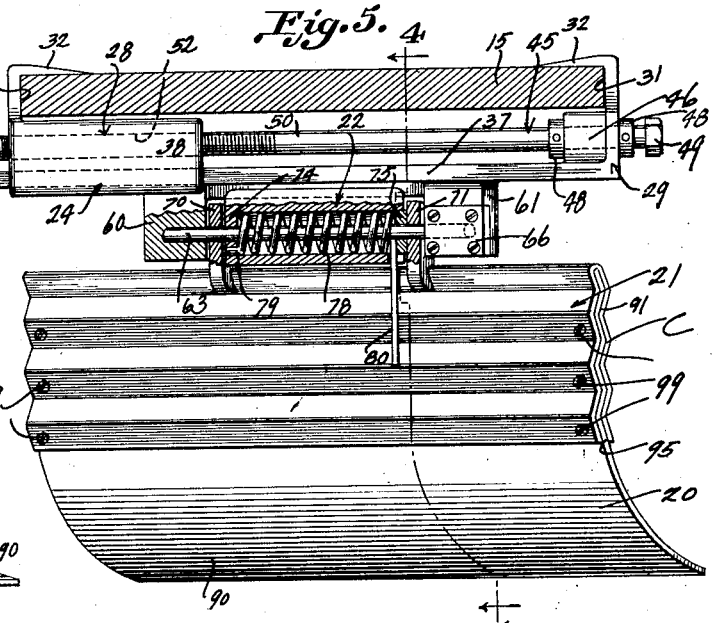
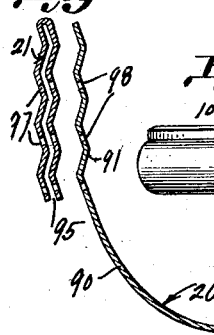
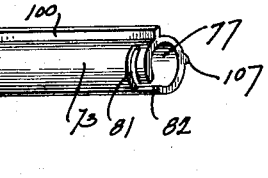
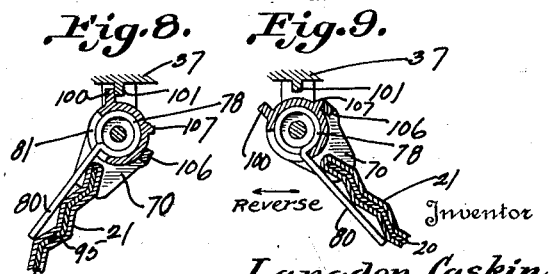
Inventor
Langdon Caskin
By Lancaster Allwine
Attorneys Patented Mar. 4, 1930

1,749,465

UNITED STATES PATENT OFFICE

LANGDON CASKIN, OF DEVON, PENNSYLVANIA

SNOW-SHOVEL ATTACHMENT FOR VEHICLES

Application filed August 9, 1928. Serial No. 298,525.

This invention relates to improvements in snow plows for motor vehicles.

The primary object of this invention is the provision of improved snow plows for motor vehicles, particularly well adapted to be mounted upon each of the running boards of an automobile, at the rear ends thereof, in such relation that snow, slush, and the like may be deflected laterally outwardly away from the vehicle in advance of the traction wheels of the vehicle.

A further object of this invention is the provision of an improved snow plow structure for motor vehicles adapted to laterally deflect snow, ice, and the like from the path of travel of the traction wheels; the improved snow plow including a plow blade with an improved resilient mounting which will enable the same to yieldably give should it meet an obstruction, without fracturing the same, and which may collapse should it meet with an obstruction when the vehicle is being reversed.

Other objects and advantages of this invention will be apparent during the course of the following detailed description.

In the accompanying drawings, forming a part of this specification, and wherein similar reference characters designate corresponding parts throughout the several views, Figure 1 is a fragmentary plan view of the rear end of a motor vehicle, showing the relative location of the improved snow plows, on the rear ends of the running boards in advance of the traction wheels.

Figure 3 is a plan view of the improved snow plow attachment.

Figure 4 is a vertical sectional view taken through details of the snow plow substantially on the line 4—4 of Figure 5.

Figure 5 is a view, partly in section, showing improved details of the snow plow taken on the line 5—5 of Figure 3.

Figure 6 is a fragmentary sectional view taken through details of the snow plow support and blade.

Figure 7 is a perspective view of the snow plow spring barrel.

Figure 8 is a fragmentary sectional view taken at the pivot connection of the blade, showing how the spring is flexed so that the blade may give slightly under extraordinary resistances.

Figure 9 is a sectional view similar in detail to that shown in Figure 8, but showing the blade in the position which it may collapse upon reverse driving of the car, in event the blade meets an obstruction.

Figure 1:
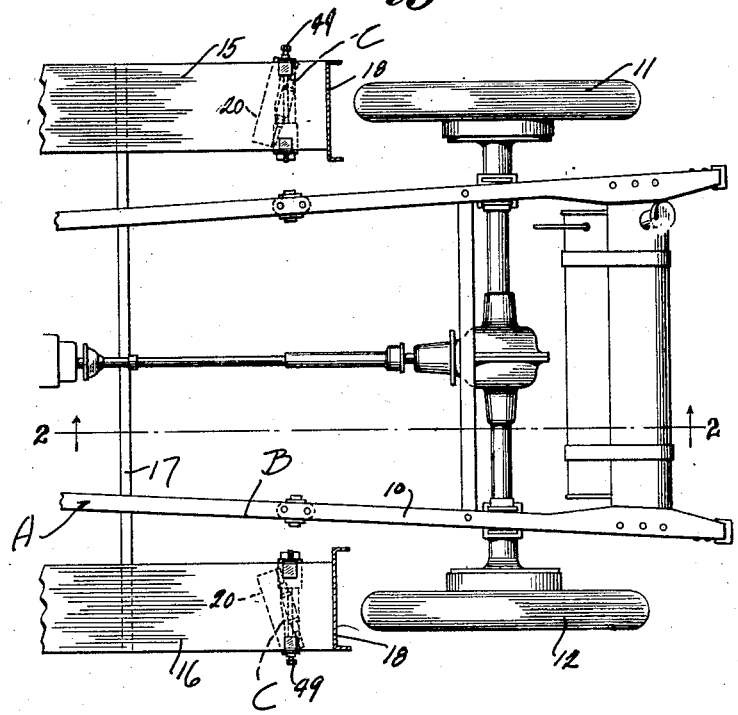
Figure 2:
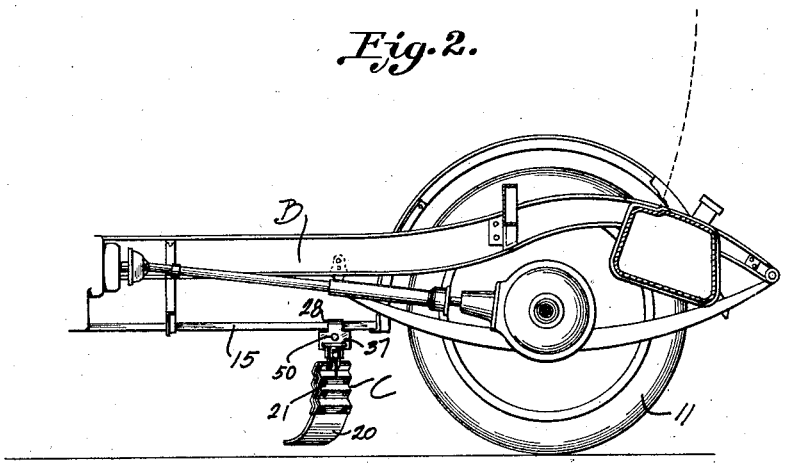
Figure 2 is a sectional view taken substantially on the line 2—2 of Figure 1.

In the drawings, wherein for the purpose of illustration is shown only a preferred embodiment of the invention, the letter A may generally designate an automobile, which may consist of a chassis B upon which the improved snow plows C may be mounted.

The chassis B includes the frame 10, and rear running gear including traction wheels 11 and 12, driven in the usual manner. Running boards 15 and 16 are supported as by means 17 on the chassis frame 10, at opposite sides thereof, the same having rear fender connections 18, as is usual.

The improved snow plows C are adapted to be mounted upon each of the running boards 15 and 16, at the rear ends thereof, immediately in front of the traction wheels 11 and 12, so that the snow plow blades depend below the running board for the purpose of clearing snow in advance of the wheels.

The improved snow plow constructions C each includes a blade 20 adjustably supported in a channel member 21, which is mounted by means 22 in a pivoted resiliently urged relation upon a running board clamp 24.

The clamp 24 preferably consists of complementary J-shaped clamp parts 28 and 29, having sockets 30 and 31 respectively adapted to receive the inner and outer marginal portions of the running board 15 or 16, as shown in Figure 5 of the drawings. The tongue portions 32 overlying the top surfaces of the running boards are tapered to a chisel edge, to obviate obstructions and provide a very durable connection. The clamp part 29 is provided with a relatively long beam portion 37 which slidably fits in the socket channel 40 provided in the body 38 of the clamp part 28; the elongated beam 37 being slidably retained upon the body 38 by overhanging flanges 41, shown more particularly in Figure 4 of the drawings, which retain the same in the channel 40. A rotatable clamping bolt 45 bears in a bearing sleeve 46 provided as a part of the clamping member 29, with releasable retaining collars 48 at each side of the bearing sleeve 46 to hold the bolt 45 against longitudinal movement. The head end 49 of the bolt is exposed at the outer side of the clamping part 29, along the outside edge of the running board of the vehicle, where the same may be readily reached for adjustment. The body 50 of the bolt 45 extends along beneath the running board and above the beam 37, and at its threaded end it is received in a suitable screw threaded socket 52 provided in the clamp part 38. It is quite apparent that upon rotation of the bolt 45, the clamp parts 28 and 29 will be relatively moved for engaging in a vise clamped relation upon the running board, with the beam 37 lowermost.

The beam 37 is provided with depending bearing lugs 60 and 61, which are adapted to detachably receive the ends of a supporting axle or shaft 63. The lug 60 at the side facing the lug 61 is provided with a socket which receives an end of the axle 63, as shown in Figure 5, and a socket of the lug 61 is detachably closed longitudinally by a detachable cover plate 66 which enables the assemblage of the axle 63 and its associated details in place.

The blade support 21, to be subsequently described, is provided with a pair of fixed upstanding lugs 70 and 71, which receive the axle or shaft 63 therethrough, either being keyed thereto or bearing thereon. The lugs 70 and 71 are in spaced relation lying just at the inside facing surfaces of the clamp supporting lugs 60 and 61 respectively.

A spring barrel 73, comprising part of the means 22, is provided, including a cylindrical body portion having fixed and detachable end walls 74 and 75, respectively, suitably apertured to rotatably receive the shaft 63 axially therethrough. The compartment 77 within the barrel 73 is adapted to receive a spiral spring 78, preferably very strong, having one end 79 anchored in the fixed wall 74, and having the opposite end provided with a radial straight portion 80, which extends transversely through a segmental slot 81 provided about a part of the circumference of the barrel 73, at the end which receives the detachable wall 75. An entrance way 82 from the end of the spring barrel to the slot 81 is provided, to permit of the assemblage of the portion 80 of the spring 78 in place, as illustrated in the drawings.

Referring at this time to the blade construction, the said blade 20 includes a concavo-convex blade body 90, having a corrugated attaching portion 91 continuous therewith. The blade has the same cross section throughout its length, and the length may vary, although it is preferably about the same as the width of a running board. The portion 90 need not have any particular degree of curvature, except that it shall efficiently perform a scooping function in throwing the snow, broken ice, or slush to the outside of the adjacent side of the vehicle, in advance of the traction wheel it protects. It will be particularly noted that the blade is adapted to lie transversely below the running board at an acute angle to the line of the running board, the plane of which is preferably at an angle of less than 90° with respect to the adjusting bolt 45; the latter being at right angles to the running board length. Thus, the supporting lugs 60 and 61 are positioned on the clamp part so that the axles 63 may be received at the same angle which the blade is adapted to have, as to length transversely of the running board.

The supporting channel or member 21 preferably is a piece bent intermediate its ends, and transversely corrugated to provide a corrugated or wavy channel socket 95 adapted to receive the corrugated portion 91 of the blade 20 therein; it being understood that the channel member 21 is open at an end so that the blade attaching portion may be slipped inwardly from said end of the supporting member 21, as is perfectly obvious from Figures 5 and 6 of the drawings. Different running boards vary in height from the ground, and thus the corrugated attaching portion 91 and its corrugated channel 21 provide a means which will permit of the efficient support of the blade in a vertically adjustable relation. That is, assuming that the running board is very low, and under any circumstance it is desired to have a clearance of two inches below the lower edge of the blade; the blade will then be slipped into the socket 21 to its fullest extent, as shown in Figure 5 of the drawings. However, if the running board is relatively high from the ground surface, as in some of the older makes of cars, the corrugations of the attaching portion 91 may be slipped into the channel member 21 a step lower than that shown in the relation of Figure 5, and the channel member 21 will hold the blade in this position. In order to doubly insure that the blade 20 will be held in the channel member 21, the channel member 21 is provided with transverse openings 97 therethrough, adapted to align with openings 98 in the attaching portion 91 of the blade 20, to receive detachable screws 99 which may hold the blade 20 in proper position against pulling from the channel socket or member 21.

Under normal working conditions, with the vehicle being propelled forwardly, a longitudinal rib 100 along the top of the spring barrel 73 abuts at the rear side of a stop flange 101, which is fixed to the clamp beam 37 in depending relation therefrom between the lugs 60 and 61. With the parts arranged in this position, as is shown in Figure 8, should the shovel or snow blade encounter a variable resistance, due to drifting snow, or unequal packing of the same, the spring 78 will yield and permit the blade 20 to move under the variable resistance and flex backward to permit the obstruction to pass beneath the blade 20. This action of the spring is shown in Figure 8 of the drawings, and it is apparent therefrom that the spring 78, which is very strong, normally urges the blade 20 forwardly at its lower end and permits the blade to flex rearwardly due to the varying forces and obstructions which the blades encounter under practical working conditions. This is a very important and practical feature of the plow.

A cross rod 106 is integrally secured at its ends to the lugs or supporting extensions 70 and 71 of the blade supporting channel member 21, which cooperates with a rib 107 provided along the spring barrel 73, as shown in Figures 8 and 9 of the drawings. It is desired that the blade shall collapse when the vehicle is reversed to take it out of the way. Under these circumstances the blade meeting the obstructing snow or ice will move in the direction of the fore part of the vehicle and the connection 106 will engage the rib 107 and throw the spring barrel thru an arc sufficient to permit the obstruction to pass beneath the blade, and which position is shown in Figure 9 of the drawings, and move the rib 100 away from the flange 101 above described.

As to its height, the blade 20 curves downwardly and forwardly, and as to the length, the same slopes from the fore part of the vehicle rearwardly at an angle of 15°, more or less, to a horizontal line normal to the longitudinal axis of the vehicle. Under these circumstances the snow shovel will push the snow, slush, or readily broken ice from the position in advance of the traction wheels of the vehicle, clearing a way for an efficient propelling of the vehicle. The device is practical in its working construction, and may be economically constructed to serve as an attachment for vehicles, which may be removed without alteration to the vehicle structure, and when in position the same is not unsightly.

Various changes in the shape, size, and arrangement of parts may be made to the form of invention herein shown and described, without departing from the spirit of the invention or the scope of the claims.

I claim:

1. In a snow plow construction a carrier of corrugated channel cross section, a blade including a scooping portion and a corrugated attaching portion adapted to interfit to various depths in the corrugated channel of the carrier.

2. In a snow plow construction a carrier of corrugated channel cross section, a blade including a scooping portion and a corrugated attaching portion adapted to interfit to various depths in the corrugated channel of the carrier, and means to clamp the blade attaching portion in the carrier at the position adjusted.

3. In a snow plow construction a support, a spring barrel, a spring in the spring barrel, means anchoring one end of the spring to the spring barrel, the other end of the spring extending from the spring barrel for movement relative about the spring barrel, means pivotally mounting the spring barrel for a limited degree of movement upon the support, a blade structure pivoted on the same pivot axis as the spring barrel having the movable end of the spring operating thereagainst for urging the blade to a snow shoveling position.

4. In a snow plow structure of the class described a transversely adjustable clamp support having depending spaced extensions, a shaft rotatable in said extensions, a barrel rotatably supported for limited arcuate movement upon said shaft, a spring in the barrel having one end anchored thereto and the other end movable relative about the barrel, a blade, and means mounting the blade for pivotal movement about the axis of said shaft, the end of the spring which is relatively movable with respect to the barrel engaging against the blade for urging it in one direction, said barrel and clamp support having movement limiting stops thereon.

LANGDON CASKIN.